United States Patent
Saxon et al.

(10) Patent No.: US 7,072,763 B2
(45) Date of Patent: Jul. 4, 2006

(54) INTELLIGENT LOAD DISTRIBUTION SYSTEM

(75) Inventors: Nancy L. Saxon, Oakland Township, MI (US); James Eckelberry, Canton, OH (US); John K. Ma, Rochester, MI (US); Frank A. Maly, Jr., Beverly Hills, MI (US); Joseph Melekian, Rochester Hills, MI (US); Steven R. Miller, Clarkston, MI (US); Rajesh J. Somnay, Troy, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 191 days.

(21) Appl. No.: 10/689,213

(22) Filed: Oct. 20, 2003

(65) Prior Publication Data

US 2004/0079557 A1    Apr. 29, 2004

Related U.S. Application Data

(63) Continuation-in-part of application No. 09/724,373, filed on Nov. 28, 2000, now abandoned.

(51) Int. Cl.
*G01G 19/08* (2006.01)
*G01G 15/00* (2006.01)

(52) U.S. Cl. .................. 701/124; 177/25.13; 177/136; 702/101; 702/173; 702/174

(58) Field of Classification Search .. 177/25.11–25.17, 177/136–141, 1; 702/101, 173–174; 701/124
See application file for complete search history.

(56) References Cited

U.S. PATENT DOCUMENTS

| | | | |
|---|---|---|---|
| 4,103,752 A | 8/1978 | Schmidt | |
| 4,639,872 A * | 1/1987 | McHale et al. | 701/124 |
| 4,651,838 A | 3/1987 | Hamilton et al. | 177/209 |
| 4,706,768 A | 11/1987 | Kozozian et al. | 177/138 |
| 4,836,308 A | 6/1989 | Davis et al. | 177/25.14 |
| 4,852,674 A | 8/1989 | Gudat | 177/141 |
| 4,854,407 A | 8/1989 | Wagner | 177/141 |
| 4,941,365 A | 7/1990 | Reiner et al. | 73/865 |
| 5,040,826 A | 8/1991 | Lovell | 280/6.151 |
| 5,167,289 A | 12/1992 | Stevenson | 177/141 |
| 5,314,201 A | 5/1994 | Wessels | 280/407.1 |
| 5,526,702 A | 6/1996 | Schedrat et al. | 73/862.57 |
| 5,606,516 A | 2/1997 | Douglas et al. | 702/104 |
| 5,617,072 A | 4/1997 | McNeal | 340/431 |
| 5,626,356 A | 5/1997 | Harwood | 280/405.1 |
| 5,803,502 A | 9/1998 | Noll et al. | 283/79 |
| 5,915,713 A | 6/1999 | Kniep | 280/441 |
| 6,032,090 A | 2/2000 | von Bose | 701/37 |
| 6,037,550 A | 3/2000 | Bradley | 177/136 |

(Continued)

Primary Examiner—Randy W. Gibson
(74) Attorney, Agent, or Firm—Carlson, Gaskey & Olds (57) ABSTRACT

A vehicle information system has a first load sensor for generating a first load signal based on a first vehicle load. A first position sensor generates a first position signal based on a position of a vehicle axle. A second position sensor generates a second position signal based on a position of a vehicle kingpin. A memory unit stores vehicle optimization data. An evaluation unit is in communication with the first load sensor, the first position sensor, the second position sensor and the memory unit. A general user interface for receiving input is also in communication with the evaluation unit. The evaluation unit makes an evaluation of the first load signal, the first position sensor, the second position signal, and any input and generates a vehicle optimization instruction relating to a distance between the axle and the kingpin.

15 Claims, 5 Drawing Sheets

U.S. PATENT DOCUMENTS

| | | | |
|---|---|---|---|
| 6,157,889 A * | 12/2000 | Baker | 701/124 |
| 6,242,701 B1 | 6/2001 | Breed et al. | 177/144 |
| 6,252,497 B1 | 6/2001 | Dupay et al. | 340/431 |
| 6,307,164 B1 | 10/2001 | Campbell | 177/141 |
| 6,308,131 B1 * | 10/2001 | Fox | 701/124 |
| 6,357,777 B1 | 3/2002 | Linger et al. | 280/441 |
| 6,363,331 B1 | 3/2002 | Kyrtsos | 702/175 |
| 6,459,367 B1 | 10/2002 | Green et al. | 340/440 |
| 6,921,100 B1 * | 7/2005 | Mantini et al. | 280/407 |
| 2002/0038193 A1 * | 3/2002 | Grunberg et al. | |

* cited by examiner

INTELLIGENT LOAD DISTRIBUTION SYSTEM

This patent application is a continuation-in-part and claims priority to U.S. Nonprovisional Patent Application No. 09/724,373 filed on Nov. 28, 2000, now abandoned.

BACKGROUND OF THE INVENTION

This invention relates to a system for determining and optimizing load distribution on a vehicle.

The distribution of load over a trailer significantly alters its handling, performance, and fuel efficiency. Braking, acceleration, turning, as well as operational safety of the vehicle are all affected by load distribution. Improper loading of a trailer not only reduces vehicle performance but also increases the risk of an accident.

Additionally, state and federal laws impose load limits on tractor/trailer combinations. Limits exist on maximum weight, weight over an axle, and weight over a tandem axle. These limits vary from state to state, requiring a driver to know whether he is in compliance with these limits as he crosses each state line. In the event a load exceeds these limits, the driver must either reduce or redistribute the load over the trailer to conform to regulatory requirements. Failure to comply with such limits can lead to the imposition of fines or other penalties.

Currently, load distribution is determined by employing rudimentary methods such as weighing the vehicle on a load scale. Typically, a tractor/trailer is driven onto a platform with load cells. These load cells send out electronic signals to junction boxes, which then sum all of the signals into one signal so that the signal can be read by a load indicator. The load of each axle can be determined either by derivation from the whole weight of the tractor/trailer or by weighing each axle individually.

On board systems for weighing load also exist. One such system measures the load directly by reading load cells on a bed. Another system measures load indirectly by relating load to air pressure on a suspension. Such systems provide the driver with a reading of load distribution only. They do not provide information on how load should be distributed.

While these foregoing methods provide basic information about the distribution of weight over a tractor/trailer, they do not provide information on how to optimize the distribution of weight to comply with load limits or to enhance vehicle performance. To determine compliance with load limits, a driver must manually compare load distribution values with state and federal weight limit tables. Because these limits vary from jurisdiction to jurisdiction as well as by tractor/trailer type and characteristics, for the hauling of particularly heavy loads, a driver must maintain updated tables for each jurisdiction and compare these tables with his load distribution for each state of operation.

Moreover, the measurements offered by these foregoing methods of determining load distribution are not integrated or analyzed with other vehicle characteristics that affect vehicle maneuverability and handling, such as tire pressure, axle position, or trailer height. Load distribution is accordingly not optimized for performance.

A trailer may have a slider, which permits the driver to adjust the location of the rear axles of the trailer relative to the front axle. When unloading, the slider is typically positioned closest to the rear of the trailer. Also, when there is little or no load in the trailer, the slider is usually moved to the position closest to the front of the trailer. However, the repositioning of the slider in these instances may result in a less than optimal slider position for other operational situations.

A need therefore exists for a system to provide information to optimize the distribution of load, including optimizing slider position, not only to comply with state and federal law but also to optimize vehicle performance.

SUMMARY OF THE INVENTION

The present invention relates to a system for optimizing load distribution on a tractor/trailer or other vehicle. A computer or other evaluation unit reads the information from at least one load sensor, measuring the load and its distribution. The computer then evaluates the information with a database compiling information on optimizing load distribution for vehicle performance as well as for compliance with state and federal law.

The invention comprises a vehicle information system that optimizes vehicle performance and load distribution. A first position sensor generates a first position signal based on an actual location of a first vehicle component, say a trailer axle or slider. A load sensor generates a first load signal based on a first vehicle load. The evaluation unit of the vehicle information system communicates with both sensors and evaluates signals from these sensors. Based on these signals, the evaluation unit provides data on how to relocate the tractor axle for optimal vehicle performance and load distribution.

The vehicle information system may provide its instruction to a vehicle driver based on a determination of the vehicle's center of gravity as calculated from data from the first position sensor and the first load sensor. The vehicle information system may also employ a second load sensor that reads the load over a second vehicle component, such as a vehicle kingpin. A second position sensor may sense the location of the vehicle kingpin and communicate this information to the evaluation unit. The information system may also provide instruction for moving load within the vehicle to redistribute the center of gravity of the vehicle.

The evaluation unit may further receive information from a general user interface, such as an onboard computer interface, that receives input from the vehicle driver. A memory unit storing vehicle optimization data may also provide information that assists the evaluation unit in optimizing vehicle performance and load distribution. The vehicle optimization data may include information relating to federal and state load limits, such as bridge load limit laws.

The inventive information system senses the actual location of the tractor axle. A load distribution is determined electronically across the vehicle. The evaluation unit then determines an alternative location for the axle based on the sensed actual location of the axle and the load distribution across the vehicle. An alternative location of the axle is then displayed on a general user interface. Based on this information, a vehicle driver may adjust the location of the axle (by moving a slider) or adjust the load distribution.

A particular version of the invention may encompass a load sensor and two position sensors. One position sensor detects a location of a vehicle axle while the other position sensor determines the location of a vehicle kingpin. An evaluation unit receives information from the sensors as well as from a memory unit storing vehicle optimization data and a general user interface that receives input from the vehicle driver. Based on the information received from these sources, the evaluation unit may generate a vehicle optimization instruction relating to the optimal distance between the vehicle axle and the kingpin. The vehicle driver may then adjust the axle to this optimal distance.

In this way, the inventive information system provides a vehicle driver with the opportunity not only to determine his current load distribution but to adjust components of the vehicle as well as load within the vehicle to optimize the vehicle for performance as well as to comply with state and federal load limit requirements.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
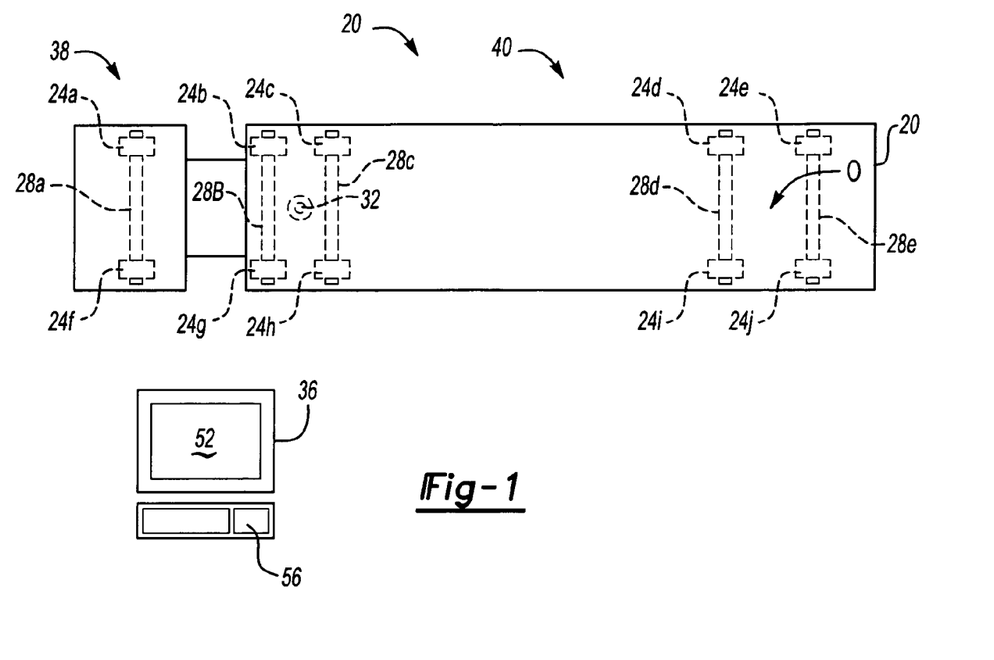
FIG. 1 shows a top view of a tractor/trailer employing an embodiment of the invention, including evaluation unit and load sensors.

FIG. 1 presents an embodiment of the invention. As known in the prior art, systems exist that measure the distribution of load across a vehicle such as tractor/trailer 20, as seen in FIG. 1. These systems employ at least one or a plurality of load sensors 24A–J to determine the load over axles 28A–E as well as kingpin 32, the mechanical pivoting pin link between the tractor and trailer. Such sensors may include load cells, piezo electric film sensors, or strain gauges. Pressure sensors measuring load on a vehicle's air suspension can also function as load sensors. Readings from load sensors 24A–b J are then used to determine load distribution across tractor 38 and trailer 40.

While readings from load sensors 24A–J provide basic information concerning load distribution, such as weight over axles 28A–E or even total weight of tractor/trailer 20, a tractor/trailer driver must determine for himself whether his load is in compliance with state and federal law load limits or whether his load is distributed in a manner that minimizes the load's effect on vehicle performance and safety. A driver driving across numerous jurisdictions must maintain updated regulations and check compliance for each state entered. Additionally, in the event of the addition or redistribution of load, the driver must not only determine whether the load is in compliance with load limits but must attempt himself to configure his load to optimize vehicle performance. Current systems fail to perform these functions for the tractor/trailer driver.

In the present invention, evaluation unit 36 automatically provides the driver with a determination of how load distribution could be optimized for compliance with state and federal limits as well as for performance and operational safety of the vehicle. Evaluation unit 36 communicates with load sensors 24A–J and evaluates the signal or information from these sensors with load optimization data stored in a memory unit within evaluation unit 36. Evaluation unit 36 determines tractor axle loads from load sensors 24A and 24F (axle 28A), 24B and 24G (axle 28B), and 24C and 24H (axle 28C), and trailer axle loads from load sensors 24D and 24I (axle 28D) and 24E and 24J (axle 28E). Additionally, loading at the tractor/trailer's kingpin 52 is determined and analyzed.

Figure 2:
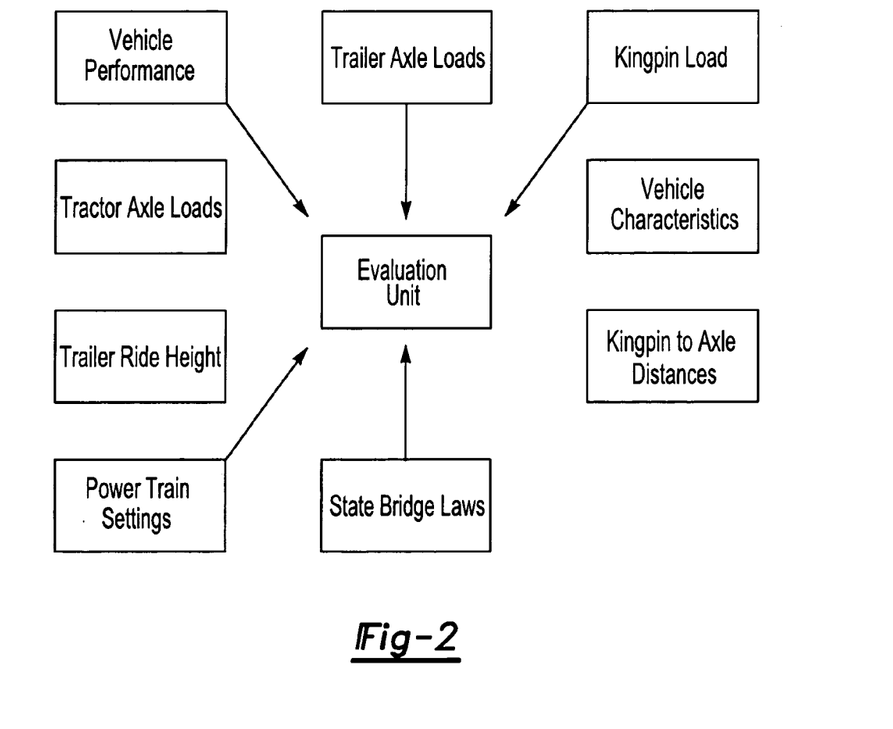
FIG. 2 shows a schematic of information provided to the evaluation unit.

FIG. 2 illustrates types of load optimization data to be evaluated by evaluation unit 36. Static vehicle characteristic information such as tractor and trailer length, the empty weight of the vehicle, ride height (nominal height of suspension measured from axle to frame), and vehicle load capacity are stored and processed with information from load sensors 24A–J to optimize load distribution. Information from tractor/trailer 20's power train such as engine and transmission data may also be stored in memory unit within evaluation unit 36 for optimizing vehicle performance and handling.

Dynamic features of tractor/trailer 20 are also monitored and evaluated. Trailer ride height, and kingpin to axle distances are a few of the dynamic inputs that are examined. A person skilled in the art would know a number of other dynamic as well as static features that may be used to monitor and evaluate load distribution.

Figure 3:
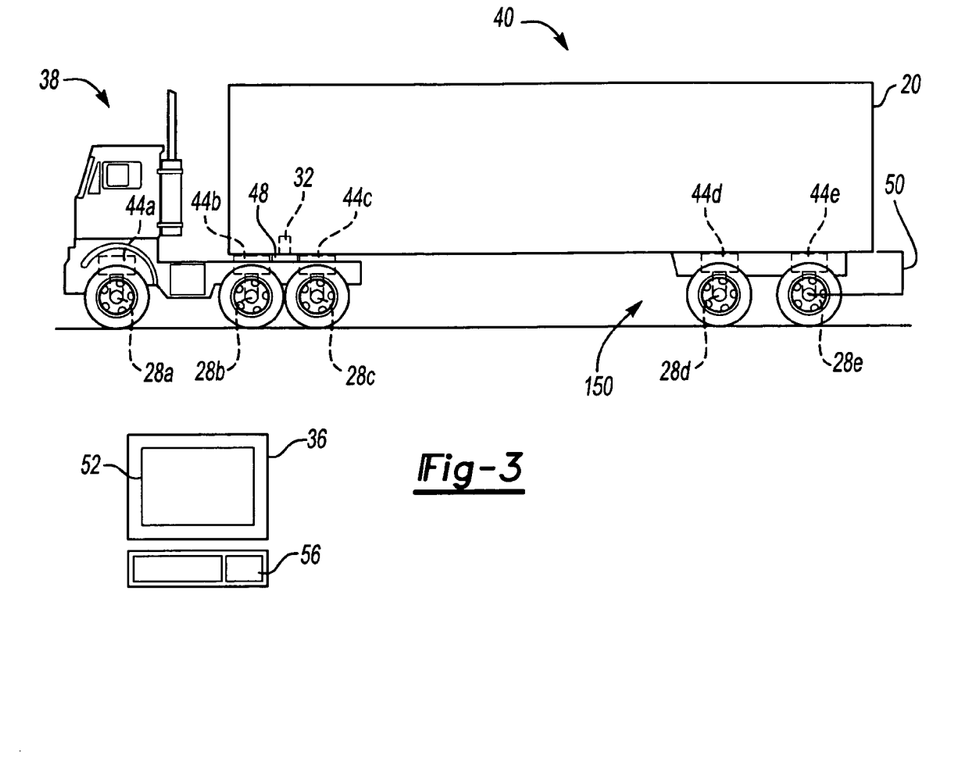
FIG. 3 shows a side view of an embodiment of the invention.

As seen in FIG. 3, commercially available position sensors measure distances between components of tractor/trailer 20. Position sensors 44A–E and 48 measure axle 28A, B, C, D, E to kingpin distances, for example the distance between 44A (axle) and 48 (kingpin). Position sensors may also monitor the position of suspension member 50 and the distance between the axle and a frame. These distances are adjustable by tractor/trailers, and factor importantly in determining optimal load distribution on tractor 38 and trailer 40. Evaluation unit 36 monitors all of these distances.

Once evaluation unit 36 assesses the foregoing dynamic and static features, evaluation unit 36 then evaluates this data with load limit information and performance information stored in memory unit of evaluation unit 36. Load limit information comprises a database of compiled state and federal load regulations. Vehicle performance information comprises a database of instructions to improve vehicle handling and maneuvering based on load distribution. From a comparison of this information, evaluation unit 36 arrives at the optimal load distribution to comply with load limits or to enhance vehicle performance and safety.

Referring to FIG. 3, display 52 provides instruction to the operator to optimize load distribution. Display 52 may be a general user interface 56 to allow driver to query or respond to queries of evaluation unit 36. The algorithms to perform these calculations are well within the skill of the worker in the art. Display 52, general user interface 56, and evaluation unit 36 can all be integrated into the cab of the tractor 36, or remote, or even hand-held.

The invention allows the driver to readily optimize his vehicle for performance and compliance with load limits. For example, a driver loads at a loading dock wit a slider in the farthest rearward position. After loading, the driver examines display 52 and queries evaluation unit 36 to optimize the tractor/trailer 20 for city driving. Evaluation unit 36 reads signals from load sensors 24A–24J and position sensors 44A–E, 48, and 50. After reading and evaluating these sensors with load optimization data, display 52 then provides the driver with the optimal position of the slider for the given load distribution for city driving. Display 52 also warns the driver of any axle overload conditions or state and federal load limit violations. After each delivery of load, the driver can continue to query evaluation unit 36 to configure the tractor/trailer 20 for optimal performance by repositioning load and/or repositioning components.

The invention allows drivers to avoid load limit violations and improve vehicle performance for any given load. The system electronically performs this function by evaluating load distribution with a database of vehicle performance information and a database of state and federal regulations. This system replaces the manual process of checking load distribution against tables of load limits as well as the tractor/trailer driver's best estimate on optimizing the vehicle for performance. Improved vehicle handling and safety, cargo efficiency and better tire and brake wear will result.

Figure 4:
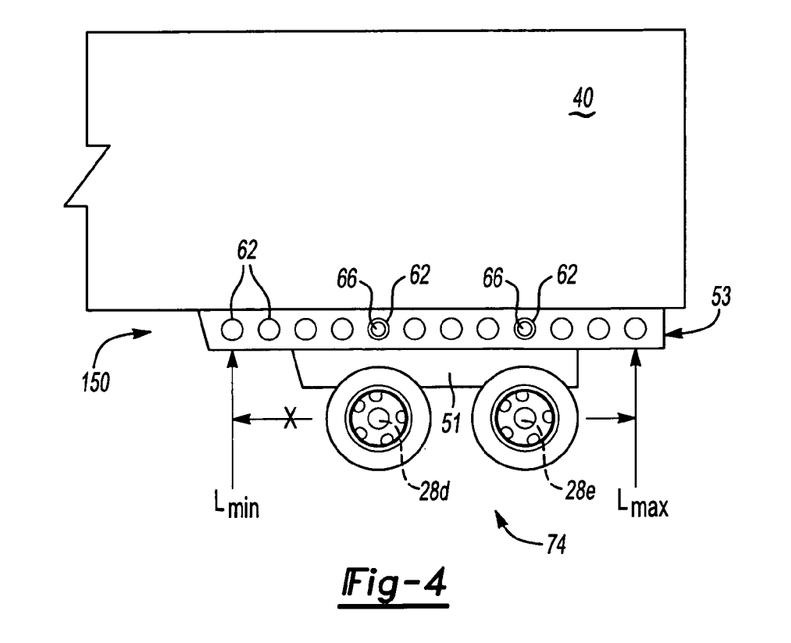
FIG. 4 illustrates a vehicle component, here a slider.

One particular version of the invention provides information to a vehicle driver on how to adjust a vehicle component of tractor/trailer 20, such as slider 50 so as to maximize performance and improve load distribution. FIG. 4 illustrates a close up view of slider 50. As known, a trailer slider carries two tandem axles, axle 28D and axle 2SE, mounted to carriage 51. Carriage 51 has pins 66 that fit within holes 62 of rails 53, which are attached to trailer 40. Holes 62 are typically spaced about six inches apart. By removing pins 66 from hole 62, carriage 51 and tandem axles 28D and 28E may be moved along axis X relative to trailer 40 to permit the position of axle 28D and 28E to change. The slider is shown schematically here, as it is simply as known in the art. Slider 150 typically allows an adjustment of about 100 inches from $L_{min}$ to $L_{max}$ of carriage 51.

Typically, a driver must guess as to the best position for axles 28D and 28E for given load. However, evaluation unit 36 provides the optimal position for slider 50 so that a driver may receive this information from display 52 and adjust axle 28D and 28E accordingly. In this way, evaluation unit 36 enhances vehicle performance and load distribution.

Figure 5:
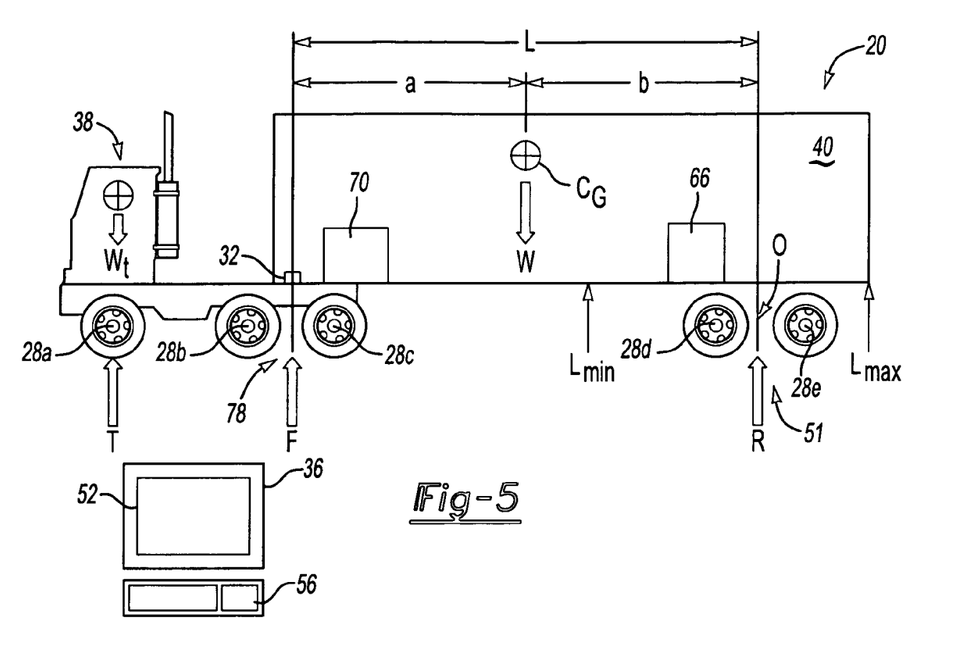
FIG. 5 illustrates optimal load distribution for a vehicle.

Specifically, referring to FIGS. 5–8, the inventive system and method will now be explained. FIG. 5 shows tractor/trailer 20 having a particular load distribution. As shown, tractor 38 has weight $W_t$ exerting a downward force $_t$ across axle 28A. Additionally, trailer 40 has center of gravity $C_G$ with weight W as indicated. Opposing $W_t$ and W are equal and opposite forces from the ground, force T, force F, and force R.

Force T represents force through axle 28A. Force F represents force through kingpin 32 while Force R represents force through point O, have the center location between axle 28D and axle 28E. As shown in FIG. 1, the value for $W_t$ may be determined from load sensors 24A and 24F. The value for T is simply the opposite value. In addition, the value for F is determined from load sensors 24B, C, G and H, while the value for R is determined from load sensors 24D, E, I and J.

Referring to FIG. 5, distance L is the distance between Force F, kingpin 32, and Point O. Distance a represents the distance between Force F and Center of Gravity, $C_G$, and Distance b represents the distance between Point O and Center of Gravity, $C_G$. Distance L may be determined from position sensors 44B and 44C and 44D and 44E.

Because trailer 40 is vertically static, the sum of moments about point O result in the following equation:

Wb=FL

F=Wb/L

Note, $W_t$ and T are ignored because their effect on the analysis is negligible. If these values were not negligible, then they may be factored into the analysis. It is also known that the best load distribution across axles 28B, 28C, 28D and 28E arises when F=R and a=b or b=L/2. Therefore, it is optimal to locate $C_G$ such that a=b. FIG. 5 shows this optimal location of Center of Gravity, $C_G$, with first load 66 and second load 70.

Figure 6:
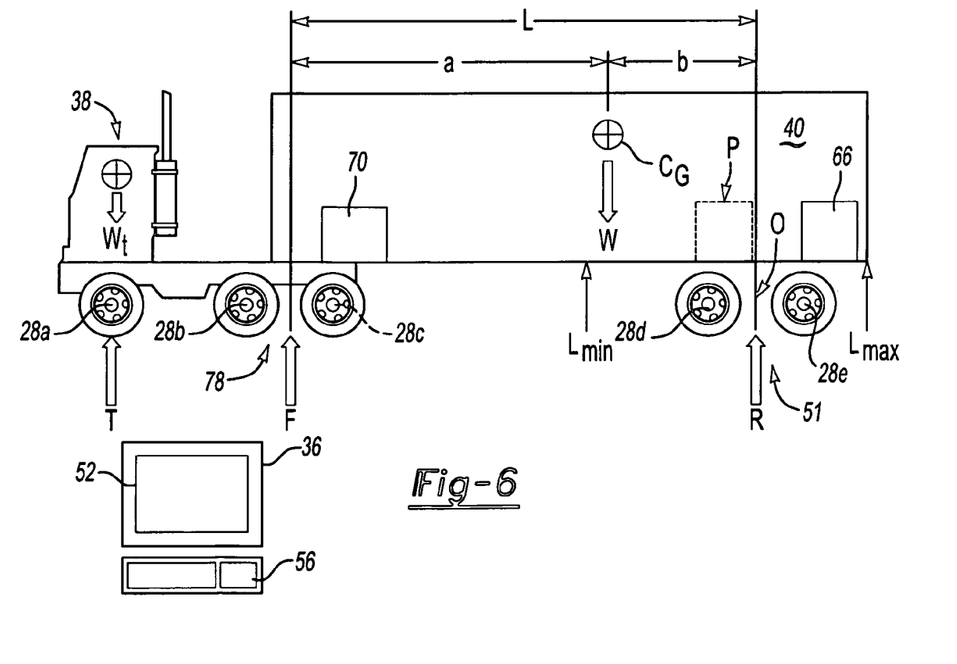
FIG. 6 illustrates the adjustment of load distribution based on information provided by the inventive vehicle information system.

As shown in FIG. 6, trailer 40 may have load distribution that places center of gravity $C_G$ of trailer 40 where distance a does not equal distance b. For example, first load 66 and second load 70 may be distributed across vehicle trailer 40 such that distance a is greater than distance b. In this instance, vehicle performance is not optimized for the particular load distribution because a is greater than b, i.e., the center of gravity $C_G$ is located too close to point O. For this particular situation, evaluation unit 36 will determine the location of $C_G$ and distances a and b. Evaluation unit 36 may then instruct vehicle driver through display 52 to move first load 66 to point P to thereby alter $C_G$ so that distance a equals distance B.

Figure 7:
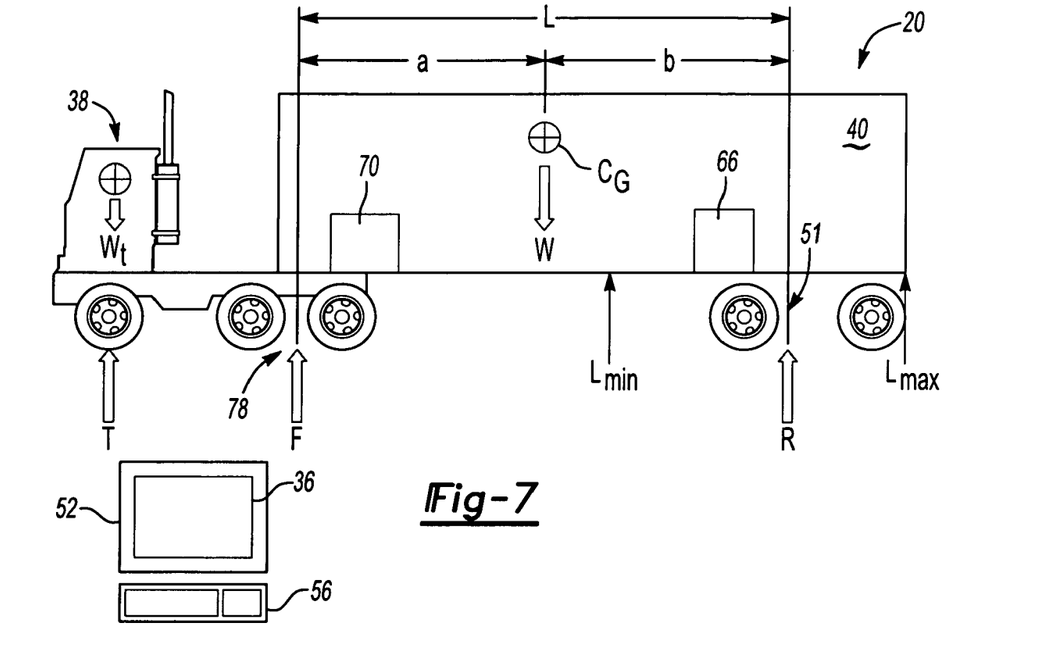
FIG. 7 illustrates the adjustment of the vehicle component based on information provided by the inventive vehicle information system.
Figure 8:
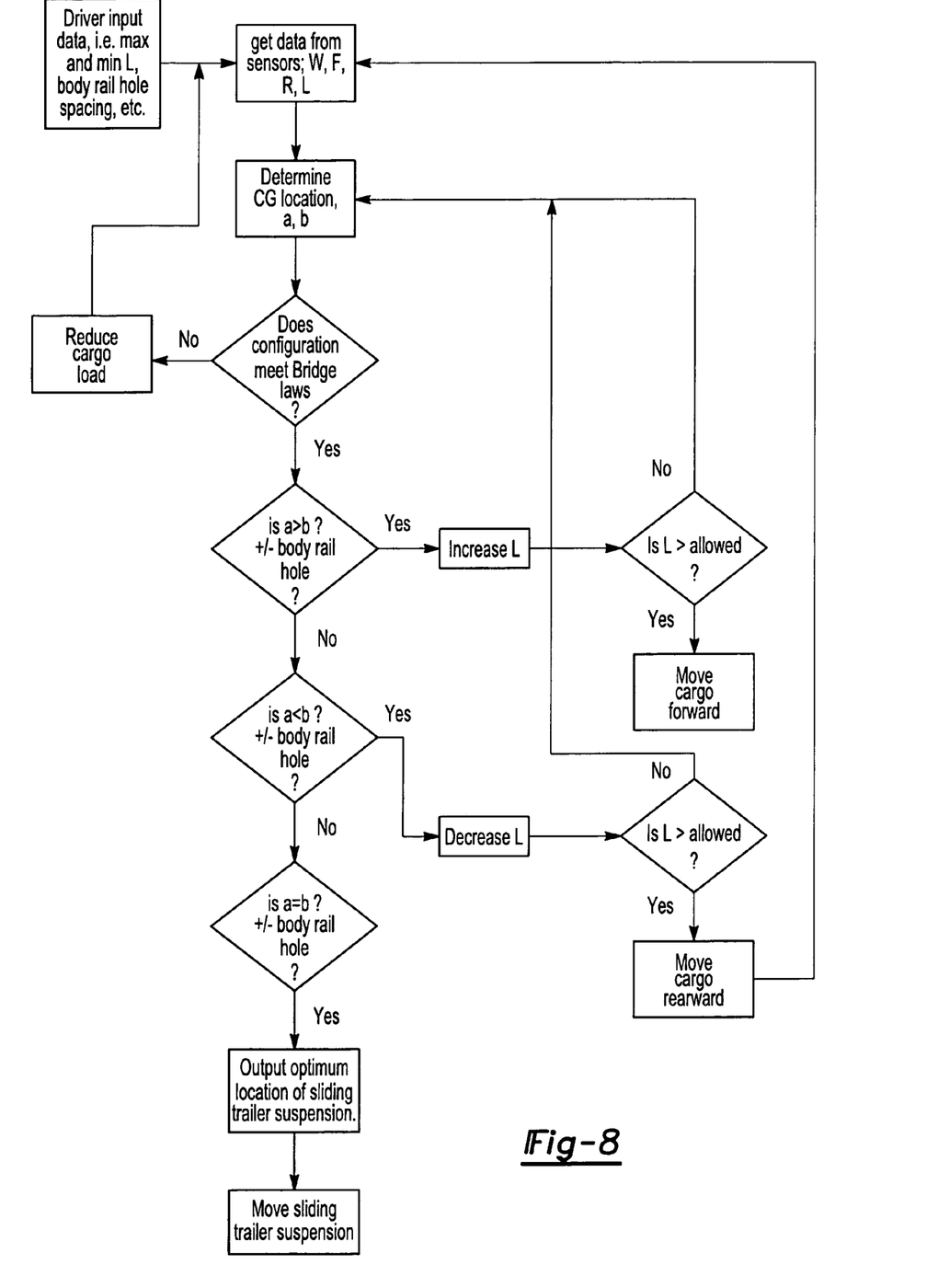
FIG. 8 illustrates a flow chart of the inventive method.

Alternatively, as shown in FIG. 7, evaluation unit 36 may instruct vehicle driver through display 52 to reposition carriage 51 so that distance L is lengthened allowing distance a to equal distance b. Both of these adjustments are determined from reading data from load sensors and position sensors of vehicle 20. FIG. 8 illustrates how evaluation unit 36 may make this determination.

As shown in FIG. 8, initially a driver may input certain data into evaluation unit 36 through general user interface 56 to inform evaluation unit 36 of certain vehicle characteristics. For example, the driver may input the maximum and minimum distance L that can be achieved by moving carriage 51. In addition, as shown in FIG. 4, carriage 51 is moved from hole to hole in increments, such as six inch increments, due to the spacing of holes 62. These increments may also be inputted into evaluation 36 by vehicle driver. This information may also be preloaded into evaluation 36 by the manufacturer.

Following input of the foregoing information, as shown in FIG. 8, evaluation unit 36 gathers data from load sensors 24B, 24C, 24G, 24H and load sensors 24D, 24E, 24I and 24J to determine W, F and R, as well as from position sensors 44B and 44C and position sensors 44D and 44E to determine L. From this information, evaluation unit 36 determines the location of center of gravity $C_G$ as well as distances a and b.

Evaluation unit 36 then retrieves vehicle optimization data, such as load limit information from memory unit within evaluation unit 36. Vehicle optimization data may comprise load limit information, such as state and/or federal bridge load limit laws. Evaluation unit 36 determines whether trailer 40 complies with these laws. If trailer 40 does not, evaluation unit 36 outputs an instruction to a vehicle driver through display 52 to reduce vehicle load. Following this action by vehicle driver, evaluation unit 30 again reads load sensors and position sensors to determine center of gravity $C_G$ location as well as distance a and distance b. When trailer 40 complies with load limit regulations, then evaluation unit 36 determines whether distance a is greater than b. Because carriage 51 moves in increments, evaluation unit 36 may take these increments into account as an error tolerance. For example, the spacing between holes 62 is six inches, then evaluation unit 36 determines whether distance a is greater than b give or take six inches. If so, evaluation unit 36 calculates a temporary value for L in which load distribution would be optimized for vehicle performance. This temporary value for L is then compared with the allowable value for distance L, $L_{max}$. If the temporary value of L is greater than $L_{max}$, then evaluation unit 36 determines that temporary value L cannot be implemented and outputs through display 52 an instruction to the vehicle driver to move cargo forward towards tractor 38 so that the center of gravity $C_g$ for trailer 40 may be adjusted. Evaluation unit 36 then determines the new center of gravity $C_G$ location as well as related distances a and distance b and begins the analysis again until temporary value L is not greater than $L_{max}$. Then, evaluation unit 36 outputs temporary value L as the suggested location for carriage 51. Carriage 51 is then moved into position to make temporary value L the distance between carriage 51 and kingpin 32.

Alternatively, if evaluation unit 36 determines that a is less than b, then evaluation unit 36 decreases L and determines whether this temporary value is less than $L_{min}$. If so, then evaluation unit 36 outputs an instruction to display 52 to the vehicle driver to move cargo toward the rear of trailer 40. Evaluation unit 36 then obtains new data from load sensors and position sensors and once again determines the center of gravity $C_G$ location as well as distance a and b. When the suggested L is allowed, then this suggested L is outputted on display 52 to allow a vehicle driver to adjust first vehicle component 74 accordingly.

Finally, if a=b within the error of tolerance, then evaluation unit indicates that first vehicle component is at its optimal location. No further adjustment is necessary. Evaluation unit 36 instructs vehicle driver that carriage 51 is at optimal position through display 52. In this way, the inventive system and method provides a vehicle driver with the opportunity to reposition load and the truck slide to optimize the truck for vehicle performance and compliance with state and federal laws.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A vehicle information system for optimizing vehicle performance and load distribution, comprising:
    a first load sensor for generating a first load signal based on a first vehicle load;
    a first position sensor for generating a first position signal based on a position of a vehicle axle mounted on a trailer slider which is slidable to a plurality of positions forwardly and rearwardly along a vehicle trailer, the position of the vehicle axle being a position along an axis between a forward and rearward position of the vehicle trailer;
    a second position sensor for generating a second position signal based on a position of a vehicle kingpin;
    a memory unit storing optimization data;
    an evaluation unit in communication with said first load sensor, said first position sensor, said second position sensor and said memory unit;
    a general user interface for receiving an input relating to a request for optimizing vehicle performance and load distribution, said general user interface in communication with said evaluation unit; and
    wherein said evaluation unit makes an evaluation of said first load signal, said first position signal, said second position signal, and said input and generates an optimization instruction relating to a distance between said vehicle axle and said vehicle kingpin, and said optimization instruction being a desired position of the trailer slider moved along the axis between forward and rearward positions relative to the vehicle trailer.

2. A vehicle information system for optimizing vehicle performance and load distribution, comprising:
    a first position sensor for generating a first position signal based on an actual location of a trailer slider, said trailer slider slidable to a plurality of positions forwardly and rearwardly along a vehicle trailer, a location of the trailer slider being a position along an axis between a forward and rearward position of the vehicle trailer;
    a first load sensor for generating a first load signal based on a first vehicle load;
    an evaluation unit in communication with said first position sensor and said first load sensor, said evaluation unit having a first data output relating to a suggested location of said trailer slider based on said first position signal and said first load signal; and
    said suggested location being a desired position of said trailer slider moved along the axis between forward and rearward positions relative to the vehicle trailer.

3. The vehicle information system of claim 2 wherein said first data output is based on a vehicle center of gravity determinable from said first position signal and said first load signal.

4. The vehicle information system of claim 3 including a second data output relating to an instruction for altering said vehicle center of gravity.

5. The vehicle information system of claim 2 including a second load sensor for generating a second load signal relating to a second vehicle load over a second vehicle component, said second load sensor in communication with said evaluation unit.

6. The vehicle information system of claim 2 including a second position sensor for generating a second position signal based on an actual position of a second vehicle component, said second position sensor in communication with said evaluation unit.

7. The vehicle information system of claim 2 including a general user interface to receive an input relating to a request for optimizing vehicle performance and load distribution.

8. The vehicle information system of claim 2 including a memory unit storing optimization data.

9. The vehicle information system of claim 8 wherein said optimization data relates to load limit information.

10. A method of adjusting vehicle load distribution comprising:
    a) electronically sensing an actual location of a first vehicle component;
    b) electronically determining a load distribution across a vehicle;
    c) electronically determining an alternative location of the first vehicle component based on a sensed actual location of the first vehicle component and the load distribution across the vehicle;
    d) electronically outputting the alternative location of the first vehicle component to a general user interface, and wherein the first vehicle component is a trailer slider, said trailer slider being movable forwardly and rearwardly along an axis which is perpendicular to a second and third axis of a pair of axles mounted on the trailer slider, and said alternative location being a proposed adjusted position of the trailer slider along the first axis between forward and rearward positions on a trailer.

11. The method of adjusting vehicle load distribution of claim 10 including the step of:
   e) adjusting a location of the first vehicle component based on the load distribution.

12. The method of claim 11 including the step of:
   f) adjusting the load distribution.

13. The method of claim 10 wherein step a) comprises determining the actual location of the first vehicle component relative to a second vehicle component.

14. The method of claim 13 wherein the second vehicle component comprises a vehicle kingpin.

15. The method of claim 10 wherein step b) comprises determining a center of gravity of the vehicle.

* * * * *